United States Patent [19]

Schear

[11] Patent Number: 5,121,217
[45] Date of Patent: Jun. 9, 1992

[54] METHOD OF RECORDING AND CORRECTING SPATIAL-COLOR ARTIFACTS

[76] Inventor: Steven D. Schear, 1818 W. 145th St., #10, Gardena, Calif. 90249

[21] Appl. No.: 506,113

[22] Filed: Apr. 9, 1990

[51] Int. Cl.⁵ .......................... H04N 5/84; H04N 9/79; H04N 1/21; G03F 3/10
[52] U.S. Cl. ............................ 358/296; 358/244; 358/332; 358/76; 358/909; 355/20
[58] Field of Search .......... 358/76, 296, 909, 474, 358/485, 332, 244; 354/1; 369/121; 346/110 R; 355/20

[56] References Cited

U.S. PATENT DOCUMENTS

| | | | |
|---|---|---|---|
| 4,333,112 | 6/1982 | Matsumoto | 358/298 |
| 4,688,104 | 8/1987 | Wolcott | 358/76 X |
| 4,780,756 | 10/1988 | Shiota et al. | 358/909 X |
| 4,878,111 | 10/1989 | Meyer | 355/20 X |
| 4,924,302 | 5/1990 | Shiota et al. | 358/332 X |
| 4,975,779 | 12/1990 | Boudry | 358/244 |

Primary Examiner—Benjamin R. Fuller
Assistant Examiner—Eric Frahm
Attorney, Agent, or Firm—J. E. McTaggart

[57] ABSTRACT

This invention, in the production of color photographic exposures from a color monitor display, provides correction to eliminate the spatial-color triad artifacts introduced by the display and thus provide a hard copy with fully registered color picture elements. Also, source resolution exceeding the viewable resolution of the monitor may be captured in the hard copy. A photosensitive hard copy recording medium is exposed to an image from an RGB monitor CRT display through an optical system comprising a lens and a refractive image shifter. Three video fields, each representing a primary color component of the picture, are sequentially displayed, exposed as an image, and thus recorded photographically on the medium, the image being shifted between exposures to spatially register the triad color elements, thus eliminating spatial-color artifacts associated with the monitor. During exposure, the image picture elements may be expanded, but held in registration, so as to fill the available recording medium space rather than leave a sparse matrix. Where the picture information source and medium have higher resolution limits than a real time frame display on the monitor, the apparatus may be utilized in a further sequential procedure to spatially intersperse multiple registered frames of the picture and thus produce a hard copy having resolution exceeding the frame display resolution limit of the monitor.

15 Claims, 9 Drawing Sheets

METHOD OF RECORDING AND CORRECTING SPATIAL-COLOR ARTIFACTS

FIELD OF THE INVENTION

This invention relates to photography and in particular to opto-electro-mechanical apparatus and methods for producing a continuous tone hard copy picture recording from a color display on an electronic monitor using multiple exposures for overcoming spatial-color artifacts and resolution limitations inherent in the color display. The invention is directed to making copies of still pictures, including frames "frozen" from moving picture video information.

BACKGROUND OF THE INVENTION

Today, there is demand for an apparatus which allows pictures, which are encoded as picture information for presentation on an electronic monitor, such as a CRT or LCD type providing a color display, to be recorded as visible pictures on printing papers and other recording media such as photographic film. Such a recording apparatus should enable a person to view the conditions of a picture on a monitor before actually recording it, and then preferably utilize the same monitor to produce an image for recording.

An electronic color image is generally constructed from a two dimensional array of elements called "pels" or "pixels" (for picture elements). These pels each contain the color and intensity information at a single resolution point in the original electronic image. Ideally, an electronic color display system can reconstruct an exact likeness of the original electronic image. In practice, electronic color display system limitations can cause the reconstructed image to fall short of the original electronic information.

One of these shortcomings has to do with the difference between the way pels are captured (e.g., by a television pickup) or constructed (e.g., by a computer), as coincident locations, and the way they are rendered on common electronic color monitor displays, as adjacent elements (usually dots or stripes) grouped in a triad. Each element of a triad produces one of three primary colors. It is only when an image rendered on the screen of such electronic color display is viewed from a sufficient distance that its color triads appear to merge and reform into pels with coincident colors.

Another shortcoming of usual color display copying practice is a loss of resolution in the copy compared to that available in both the source and the photosensitive medium, due to the lower resolution limits of available electronic color displays, typically in the range of 600 to 800 lines compared to well above 2000 lines readily available in photographic recording materials. For digitally created picture information sources the resolution is often limited only by memory size, which has increased rapidly with computer technology.

It is for the above reasons, among others, that prior art color hard copy recording apparatus using a color monitor for imaging have fallen into disfavor.

The spatial-color artifact and resolution limit problems may be readily and surely solved by sending a replica of the video image signal, as provided to the viewing display, to a separate hard copy recording apparatus as has been the case with prior art. However, a recording apparatus which uses an imaging source different from the viewing display tends to be complex and require frequent re-calibration to ensure a close match between the image as viewed on the electronic color display and that recorded on the hard copy.

So although the simplest, and in some instances most desirable, approach (and the method used by some early apparatus) is to directly record the image from the screen of an electronic color monitor display onto a photosensitive recording medium, such a recording will capture the pels as triads and will therefore suffer from both spatial-color artifacts described above and loss of resolution to the extent that the viewable resolution of the electronic color display falls short of the resolution capabilities of the picture information source and the recording medium.

PRIOR ART

U.S. Pat. No. 4,333,112 to Matsumoto discloses an image scanning apparatus and method for scanning and duplicating documents with high resolution, directed particularly to scanning original documents with a two dimensional sensor array as an advancement over the usual one dimensional array, and producing multiple copies utilizing ink jet print head nozzle technology. While the Matsumoto patent is of interest in the general utilization of sparse matrix interpolation techniques and in the use of reflective image shifting apparatus in conjunction with an aperture mask in an optical input path, the Matsumoto patent does not address photographic copying from an electronic display such as a CRT monitor. For output image shifting Matsumoto utilizes mechanical image shifting (motor 26 shifting a printing head); refractive optical image shifting is not suggested, either in the output or the input path.

OBJECTS OF THE INVENTION

It is a primary object of the present invention to provide an apparatus, including a color display, and associated methods for utilizing images from the color display to produce on a photographic medium a hard copy recording corrected for spatial-color artifacts of the display.

It is another object in the above-mentioned apparatus to avoid loss of resolution, particularly loss due to limitation of the color display, so that the recorded resolution approaches that of the picture information source and the recording medium as closely as possible.

SUMMARY OF THE INVENTION

To realize these objectives, it is required to provide an apparatus which is able to record the triads from the electronic color display as single coincident resolution points on the recording medium. Further, it is required to prevent the normal real time resolution limit of the monitor from introducing an excessive loss of system resolution.

These objectives have been accomplished in the present invention of opto-electro-mechanical apparatus including a color display and associated methods for making a high quality copy by performing sequential multiple spatially corrected and frame interspersed exposures from the color display.

BRIEF DESCRIPTION OF THE DRAWINGS

The above and other objects, features and advantages of the present invention will become more apparent from the following detailed description taken with the accompanying drawings in which.

DETAILED DESCRIPTION

Figure 1:
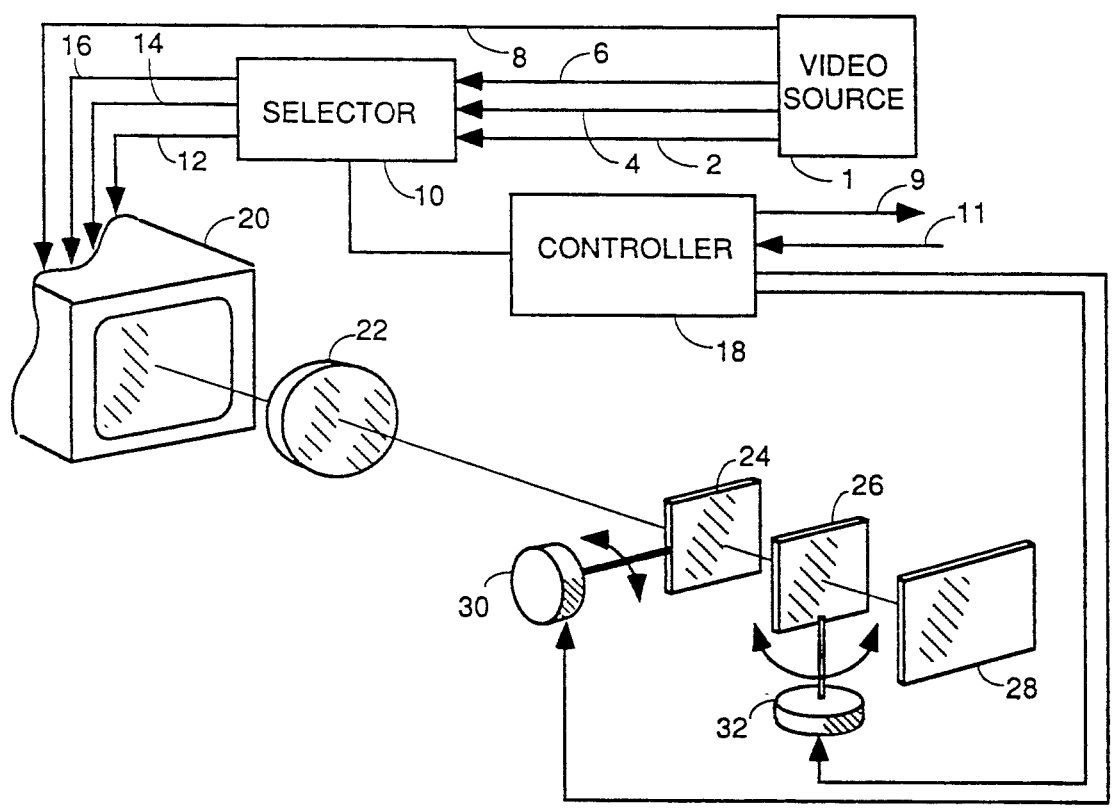
FIG. 1 is a functional block diagram of a color display hard copy apparatus in accordance with the present invention.

The functional diagram of FIG. 1 shows an opto-electro-mechanical system of apparatus configured in accordance with the present invention in an illustrative embodiment for producing a copy of a color picture from a stored picture information source through photographic exposures of a tri-color vertical stripe type CRT display.

Video source 1 provides three color picture information, which may be in the form of several frames from a video memory or some form of computer memory. From source 1, signal lines 2, 4 and 6 carry video information for three primary colors, normally red, green and blue respectively, in the form of recurring RGB video signals or video frame signals, and line 8 carries a sync signal. The three video signals on lines 2, 4 and 6 are input to a selector 10 which can select none, any one or all three of the RGB inputs for delivery via lines 12, 14 and 16, as commanded by a controller 18, to an RGB type CRT display 20, which also receives sync directly on line 8; thus display 20 will either display none of the components all three color components of the picture simultaneously (i.e., red, green, and blue), or only one of the three components, as commanded.

Controller 18 is provided with a READY output line 9, which indicates a ready condition. Controller 18 is also provided with an INITIATE COPY control input line 11 through which copying may be initiated by a switch closure. For manual control by an operator, line 9 actuates a visual indicator such as an LED and line 11 connects to a pushbutton; for automatic control both lines 9 and 11 would connect to a host computer system.

The screen of display 20 is electroluminescent and originates an optical path passing through lens 22, through a vertical deflector plate 24 and through a horizontal deflector plate 26 to form a focused image on the photosensitive surface of a recording medium 28. Deflector plates 24 and 26 are coupled to actuators 30 and 32 respectively to act as vertical and horizontal image shifters, which under control of the controller 18, are able through internal refraction to deflect the beam being formed by lens 22 so as to shift the image vertically and horizontally respectively on the photosensitive surface of the recording medium 28 by a small distance of the order of the resolution line spacing.

Figure 2:
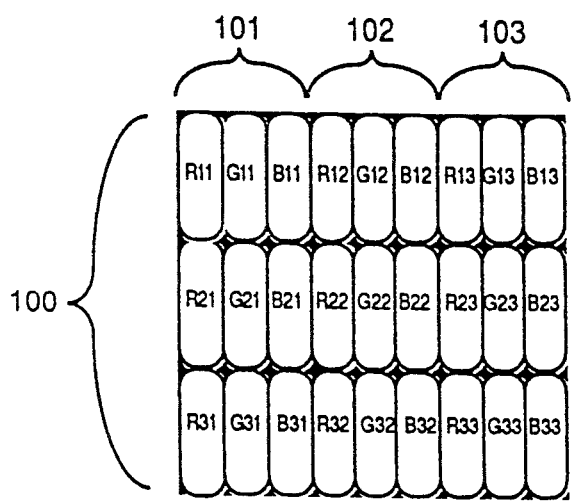
FIG. 2 is a representation of a three color stripe type electronic picture display.

The display 20 may be advantageously implemented with an ordinary color CRT monitor; for illustrative purposes it is assumed that the display is of the three primary color RGB (red, green and blue) type having a vertical "color stripe" triad phosphor pattern as indicated in FIG. 2.

Referring to FIG. 2, there is shown a portion of source picture information as it normally appears on the screen of a three color CRT type monitor having a vertical color stripe type display, the portion having a vertical span 100 of three rows and a horizontal span of three triads 101, 102, and 103 of vertical color stripes consisting of light emitting regions which may be continuous, effectively broken up into a column of "dots" by non-overlapping horizontal scan lines, or segregated into rectangular "dots" as indicated R11, G11, B11, etc. in the CRT screen structure, for example by non-luminous boundary zones or opaque masking.

Figure 3:
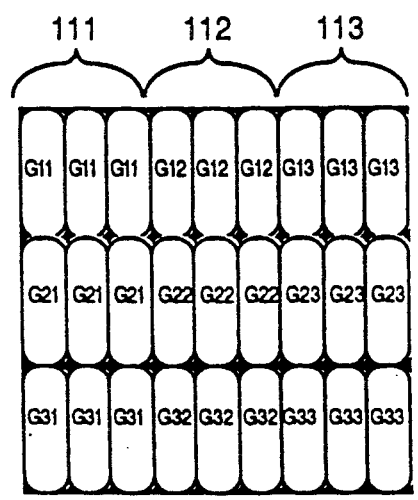
FIGS. 3-5 illustrate steps in a method of utilizing the apparatus of FIG. 1 in an exposure sequence for eliminating spatial-color artifacts in an image copied from a display as in FIG. 2.
Figure 4:
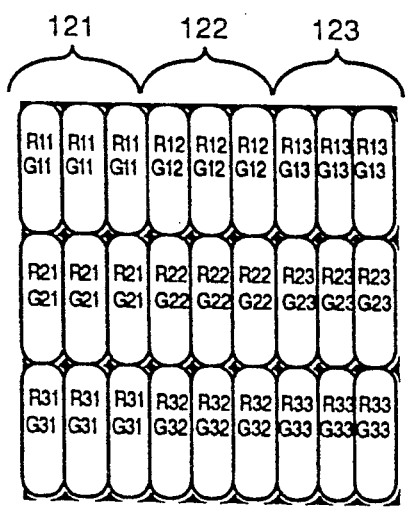
Figure 5:
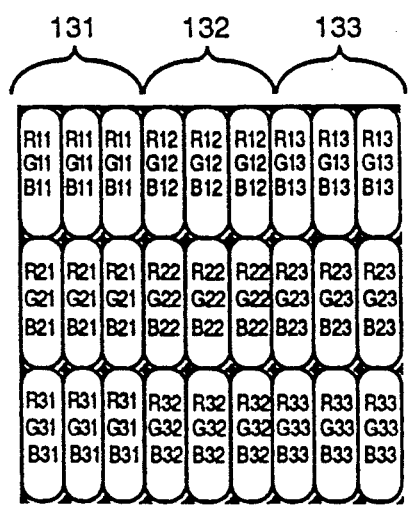

FIGS. 3-5 depict three exposures on a frame of recording medium, each representing separate primary color picture information selected from the source pattern depicted in FIG. 2, in a sequence of exposures in accordance with the present invention.

Referring to FIG. 3, in a first exposure, the image captured on the recording medium 28 comprises the green component of the picture. The image of each green phosphor dot, e.g., G11, is enlarged horizontally to cover, on the recording medium 28, the spatial area 111 subtended by all three dots in its triad 101. This enlargement may be accomplished by several different means, including an intentional misfocus or astigmatism in lens 22, or by horizontally displacing the entire image the required amount with the horizontal image shifter during this exposure step of the recording process.

Referring to FIG. 4, the second exposure, there is shown the accumulated image captured on the recording medium 28, following a second exposure which adds the red image component. The horizontal image shifter has positioned the red component over the area on the recording medium already exposed to the green image component, as described above. The red dots are elongated as in the first step, so that the red and green dots e.g. R11 and G11, both occupy the same spatial area 121 on the recording medium as the original triad 101.

Referring to FIG. 5, the third exposure, there is shown the accumulated image captured on the recording medium, following exposure to the blue image component. The horizontal image shifter has positioned the blue component over the area on the recording medium already exposed to the red and green image components, as described above. The blue dots are elongated, as in steps one and two above, so that the red, green, and blue dots, e.g. R11, G11, and B11, all occupy the same spatial area 131 on the recording medium as the original triad 101.

At the conclusion of the preceding three exposure recording process, as shown in FIG. 5 all three image components occupy the same area of the recording medium and are coincident.

Figure 6A:
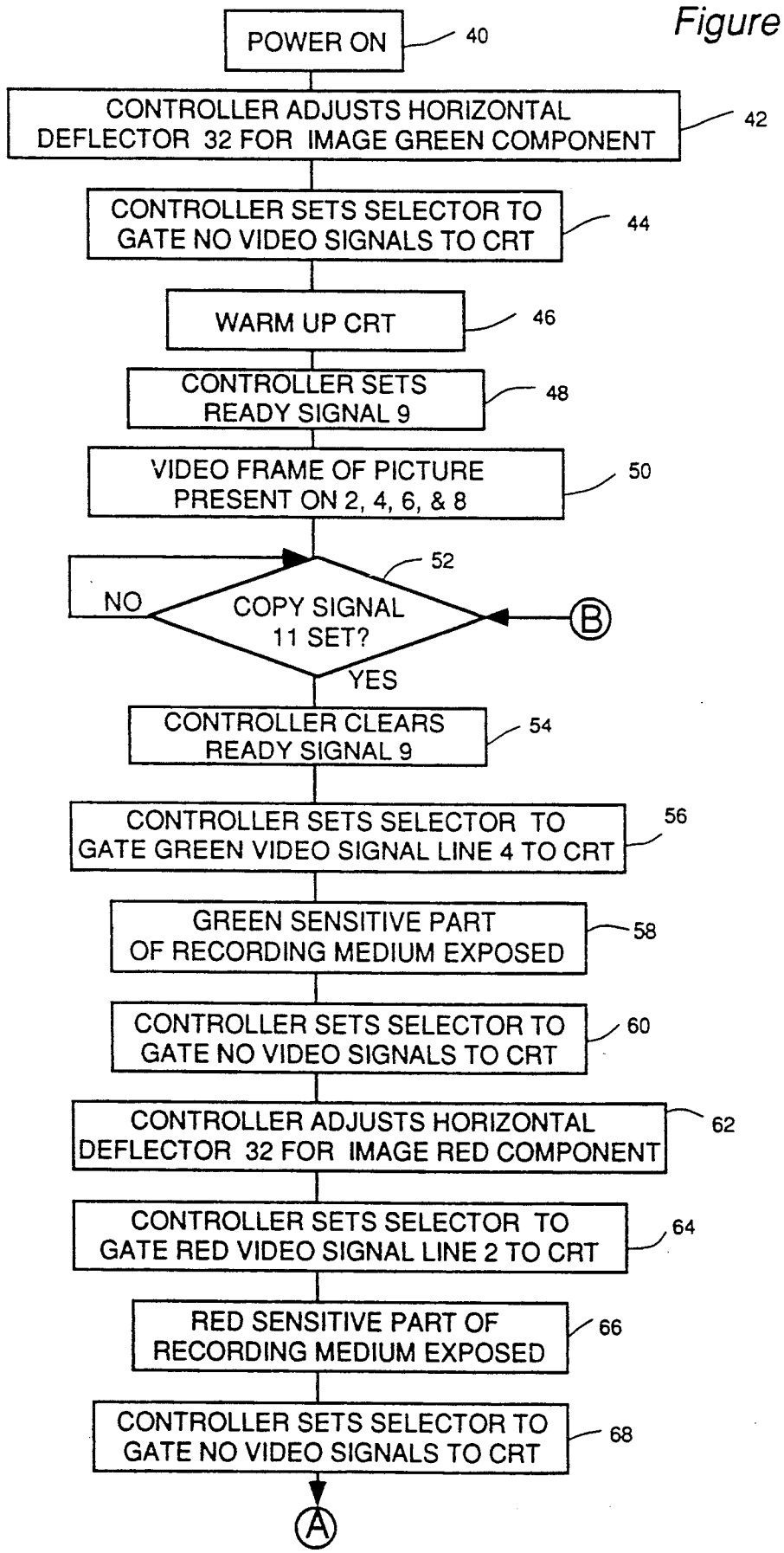
FIGS. 6A and 6B provide a flow chart of the operation sequence of the method steps of FIGS. 3-5 utilizing the apparatus of FIG. 1.
Figure 6B:
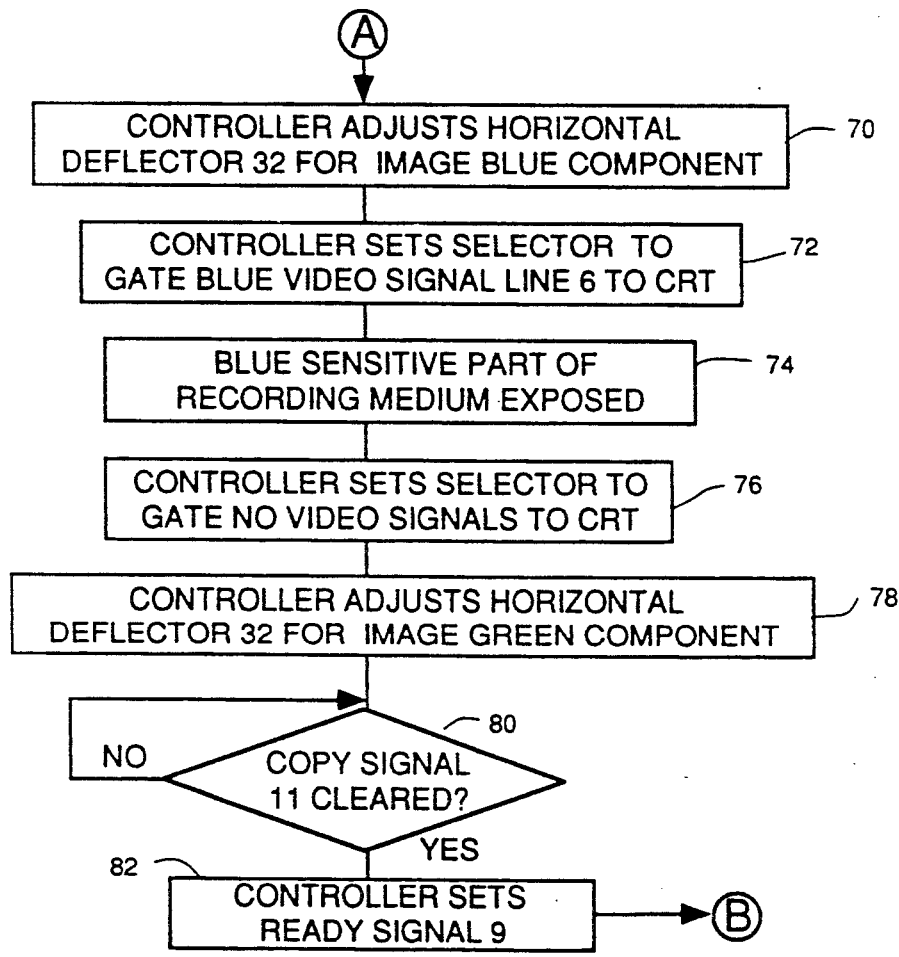

FIGS. 6A and 6B, taken together, show a flow chart of the operation sequence of the method steps of FIGS. 3-5 utilizing the apparatus of FIG. 1, to provide a more detailed understanding of the above description of the operation of this aspect of the invention, which relates to eliminating spatial-color artifacts in a copied image.

Following system power turnon at event box 40, during CRT warmup, controller 18:

at box 42 commands the actuator 32 to position mirror 26 to a setting which has been predetermined to correctly register a green image component, and at box 44 sets selector 10 to gate no video signals to CRT 20.

At box 46 a time delay allows warmup of CRT 20. At box 48 controller 18 sets a READY signal on output line 9 to notify the operator of READY status, then immediately at box 50 a video frame of picture information is applied on lines 2, 4, 6 and 8; then, At decision box 52, no further event occurs until a COPY signal is applied on line 11 by the operator or host computer system, whereupon the controller clears the READY signal from line 9 at box 54 and then sets selector 10 to gate on the image green signal via line 4 to CRT 20 at step 56.

After a predetermined exposure interval at box 58, timed to correctly expose the green sensitive part of the recording medium 28, then controller 18:

at box 60 sets selector 10 to gate no video signal to CRT 20, at box 62 adjusts the horizontal deflector 32 for the image red component, and at box 64 sets selector 10 to gate on the red video signal via line 2 to CRT 20.

After a predetermined exposure interval at box 66, timed to correctly expose the red sensitive part of the recording medium 28, then controller 18:

at box 68 sets selector 10 to gate no video signal to CRT 20, at box 70 adjusts the horizontal deflector 32 for the image blue component, and at box 72 sets selector 10 to gate on the blue video signal via line 6 to CRT 20.

After a predetermined exposure interval at box 74, timed to correctly expose the blue sensitive part of the recording medium 28, then controller 18:

at box 76 sets selector 10 to gate no video signal to CRT 20, and at box 78 adjusts the horizontal deflector 32 for the image green component, ready for the next COPY sequence.

At decision box 80 no further event occurs until the operator clears the COPY signal on line 11; then the controller 18 at box 82 sets the READY signal on line 9.

Then, as indicated by the circled letter B, the system reenters decision box 52 (FIG. 6A) and awaits a COPY signal on line 11 to start another COPY sequence.

In another aspect of the invention, the apparatus of FIG. 1 is operated in a particular sequential manner so as to accomplish the generation of a copy having substantially higher resolution than the real time resolution capability of the CRT display 20, assuming that higher resolution components are available from the video source 1. This high resolution aspect is described in the following text in connection with the picture matrix diagrams of FIGS. 7-10 and the flow chart diagrams of FIGS. 11A-11D.

Figure 7:
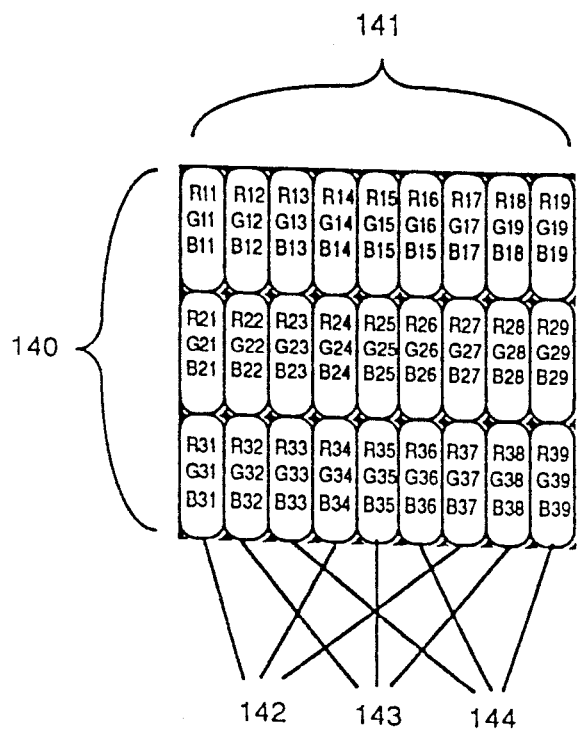
FIG. 7 is a representation of tri-color picture information stored in a digital source.

Referring to FIG. 7 there is shown a portion of video information of a picture stored in a high resolution video source, the portion consisting of only three lines 140 of nine pels each for simplicity of description.

Figure 8:
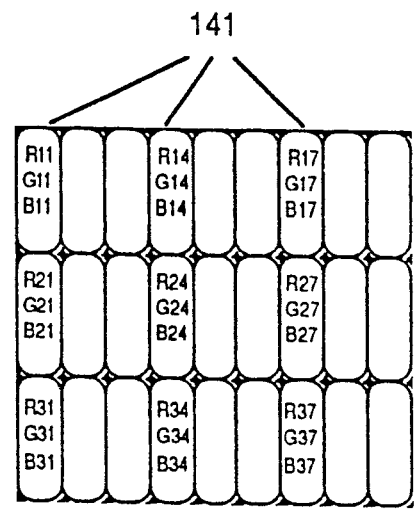
FIGS. 8-10 illustrate steps in a method of utilizing the apparatus of FIG. 1 in a sequential exposure process for capturing full resolution of the picture information of FIG. 7 in producing a photographic copy from three interspersed frames exposed at lower resolution.
Figure 9:
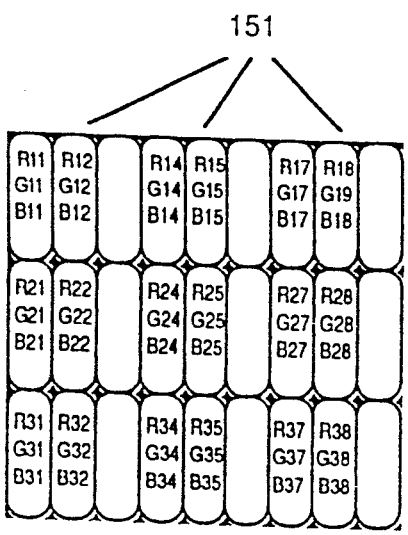
Figure 10:
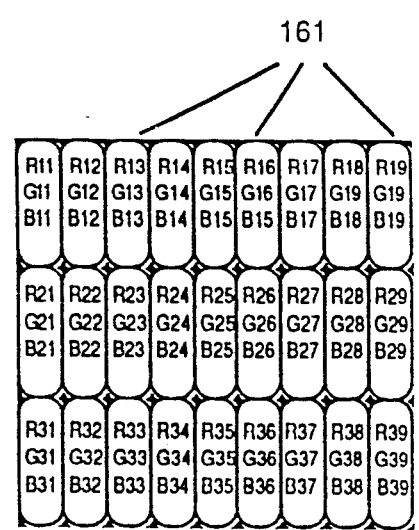

FIGS. 8-10 depict the accumulating picture recorded on a medium exposed to an image of the picture from the video source 1(FIG.1) read out sequentially as three fields 142, 143, and 144, each containing nine pels of the complete picture in a horizontal sequence, the three fields being displayed sequentially for three corresponding exposures in accordance with the present invention.

Referring to FIG. 8, the first exposure, there is shown the image captured on the recording medium exposed to the red, green, and blue components of the first field 141 of the picture information read from the source. The image shifter has positioned the red, green, and blue components over the same spatial area 142 on the recording medium.

Referring to FIG. 9, the second exposure, there is shown the image captured on the recording medium exposed to the red, green, and blue components of the second field 151 of the picture read from the source. The image shifter has positioned the red, green, and blue components over the same spatial area 143 on the recording medium.

Referring to FIG. 10, the third exposure, there is shown the image captured on the recording medium exposed to the red, green, and blue components of the third field 161 of the picture information read from the source. The image shifter has positioned the red, green, and blue components over the same spatial area 144 on the recording medium.

At the completion of the third exposure, depicted in FIG. 10, the recording medium has been exposed to three complete fields of raster scanning video signals, each consisting of the three color fields, representing the picture, with the color dots of all three of the color components of each field coincident and with the color dots of each field spatially interspersed with those of the other fields, yielding a recorded image with three times the intrinsic real time resolution of the display.

FIGS. 11A-11D, taken together, show a flow chart of the operation sequence of the foregoing method steps of FIGS. 7-10, to provide a more detailed understanding of the above description of the operation of this high resolution aspect of the invention.

Figure 11A:
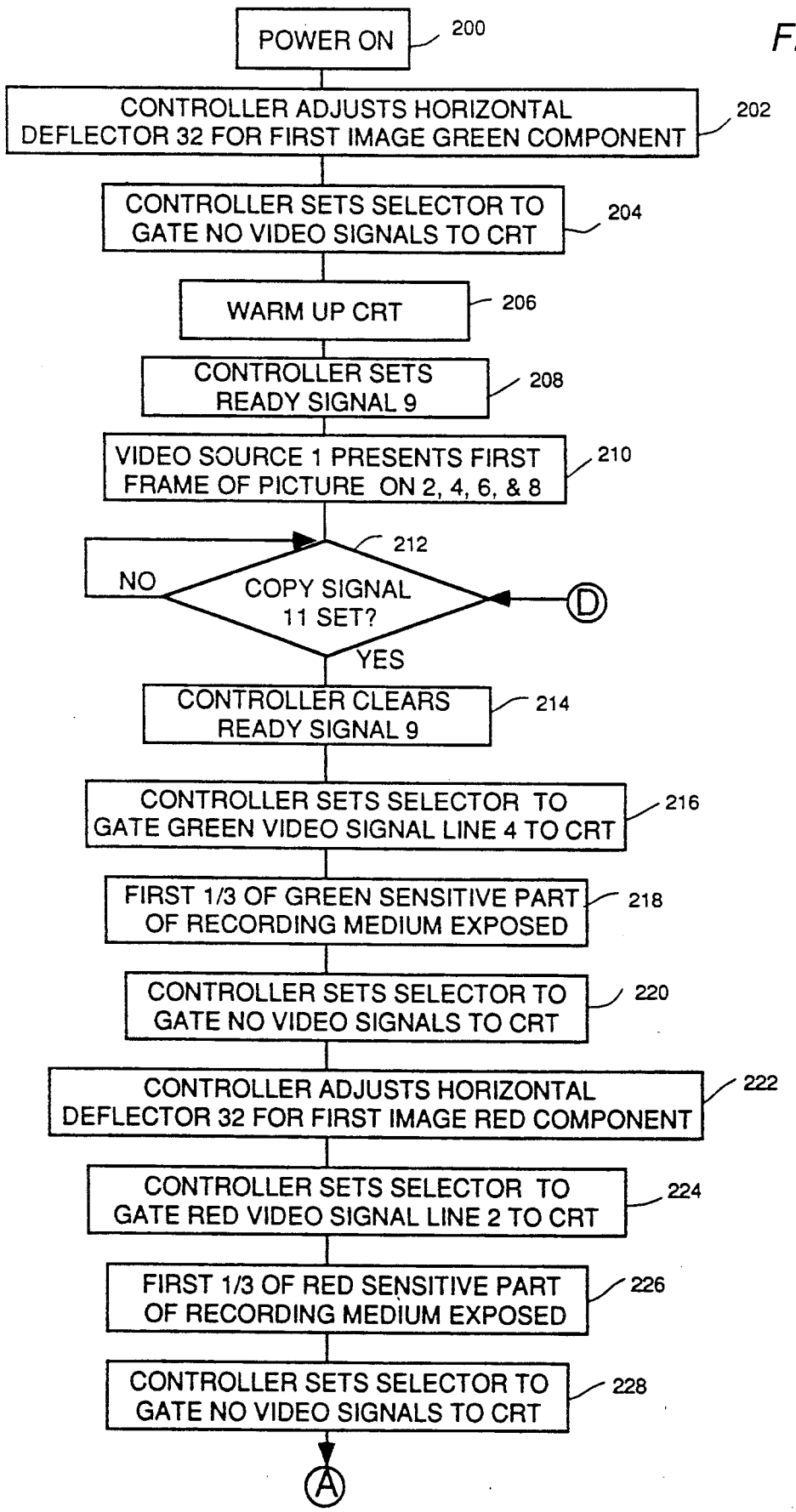
FIGS. 11A, 11B, 11C and 11D provide a flow chart of the operation sequence of the method steps of FIGS. 8-10 utilizing the apparatus of FIG. 1.

In FIG. 11A, following system power turnon at event box 200, during CRT warmup, controller 18:

at box 202 commands the actuator 32 to position mirror 26 to a setting which has been predetermined to provide proper registration of a first color field containing the green image component, and at box 204 sets selector 10 to gate no video signals to CRT 20.

At box 206 a time delay allows warmup of CRT 20. At box 208 controller 18 sets a READY signal on output line 9 to signify READY status, then immediately at box 210 a video frame of picture information is applied on lines 2,4,6 and 8.

At decision box 212, no further event occurs until a COPY signal is applied on line 11 by an operator or host computer system, whereupon the controller at box 214 clears the READY signal from line 9 and then, at box 216, sets selector 10 to gate on a signal containing the green field components via line 4 to CRT 20.

At box 218, only the first $\frac{1}{3}$ of the green sensitive part of the recording medium 28 is exposed. Then the controller 18:

at box 220 sets selector 10 to gate no video signals to CRT 20, at box 222 adjusts actuator 32 for the predetermined amount of horizontal deflection to superimpose the first image red component precisely onto the previously recorded image, and at box 224 sets selector 10 to gate on the red video signal to CRT 20 via line 2.

At box 226 the first ⅓ of the red sensitive part of the recording medium 28 is exposed. Then the controller 18, at box 228, sets selector 10 to gate no video signals to CRT 20.

Figure 11B:
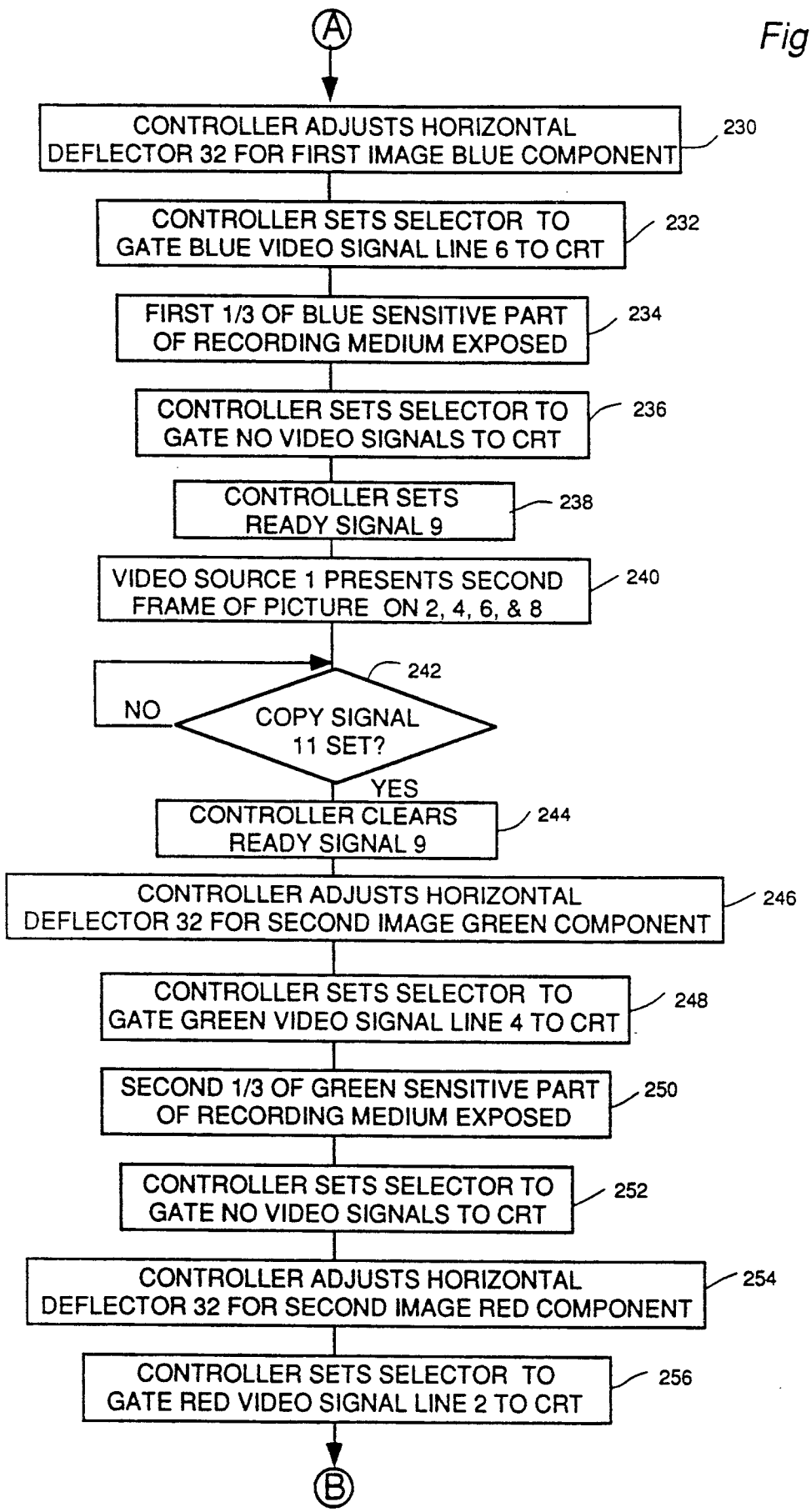

Turning to FIG. 11B, at box 230 the controller 18:
  adjusts actuator 32 for the predetermined amount of horizontal deflection to superimpose the first image blue component precisely onto the previously recorded image, and
  at box 232 sets selector 10 to gate on the blue video signal to CRT 20 via line 6.

At box 234 the first ⅓ of the blue sensitive part of the recording medium 28 is exposed. Then the controller 18:
  at box 236 sets selector 10 to gage no video signals to CRT 20, and
  at box 238 sets a READY signal on line 9.

At box 240 the video source 1 is set to display only the second frame of the picture on lines 2, 4, 6 and 8: refer to FIG. 9 and associated text.

At decision box 242, no further event occurs until the operator initiates a COPY signal on line 9, initiating the controller to:
  at box 244 clear the READY signal from line 9,
  at box 246 adjust actuator 32 for the predetermined amount of horizontal deflection to precisely register the second image green component adjacent to and spatially interleaved with the previously recorded image, and
  at box 248 set selector 10 to gate on the second image green signal via line 4 to CRT 20.

At box 250 the second ⅓ of the green sensitive part of the recording medium 28 is exposed. Then the controller 18:
  at box 252 sets selector 10 to gate no video signals to CRT 20,
  at box 254 adjusts actuator 32 for the predetermined amount of horizontal deflection to precisely register the second image red component onto the previously recorded second component green image, and
  at box 256 sets selector 10 to gate on the red video signal to CRT 20 via line 2.

Figure 11C:
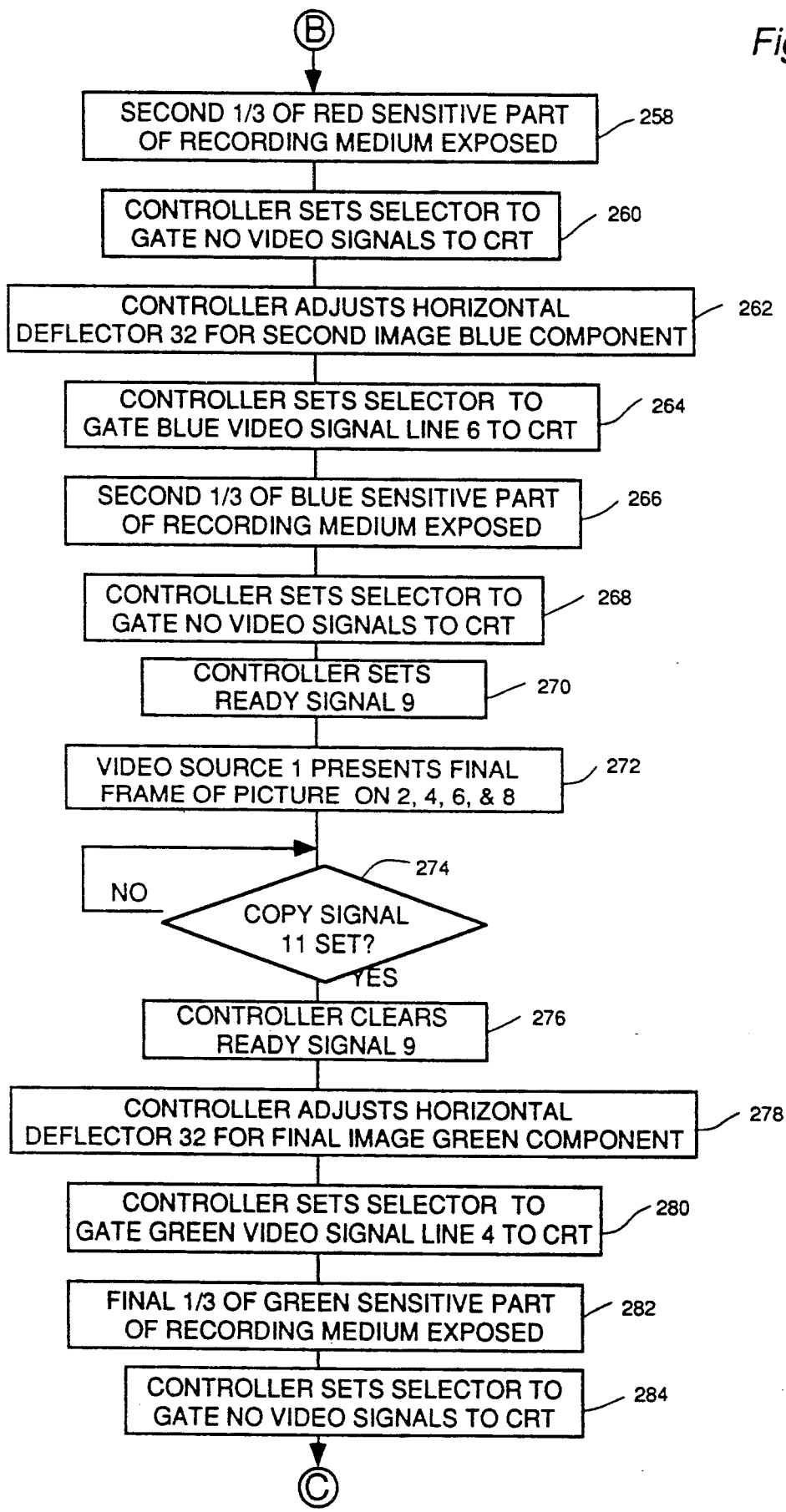

Turning to FIG. 11C, at box 258 the second ⅓ of the red sensitive part of the recording medium 28 is exposed. Then the controller 18:
  at box 260 set selector 10 to gate no video signals to CRT 20,
  at box 262 adjusts actuator 32 for the predetermined amount of horizontal deflection to precisely register the second image blue component onto the previously recorded second component green and red images, and
  at box 264 sets selector 10 to gate on the blue video signal to CRT 20 via line 6.

At box 266 the second ⅓ of the blue sensitive part of the recording medium 28 is exposed. Then the controller 18:
  at box 268 sets selector 10 to gate no video signals to CRT 20, and
  at box 270 sets a READY signal on line 9.

At box 272 the video source 1 is set to display only the third (final) frame of the picture on lines 2, 4, 6 and 8: refer to FIG. 10 and associated text.

At decision box 274, no further event occurs until a COPY signal is applied on line 9 by an operator or a host computer system, initiating the controller to:
  at box 276 clear the READY signal from line 9,
  at box 278 adjust actuator 32 for the predetermined amount of horizontal deflection to precisely register the third (final) image green component adjacent to and spatially interleaved with the previously recorded images, and
  at box 280 set selector 10 to gate on the third (final) image green signal via line 4 to CRT 20.

At box 282 the final ⅓ of the green sensitive part of the recording medium 28 is exposed. Then the controller 18 at box 284 sets selector 10 to gate no video signals to CRT 20.

Figure 11D:
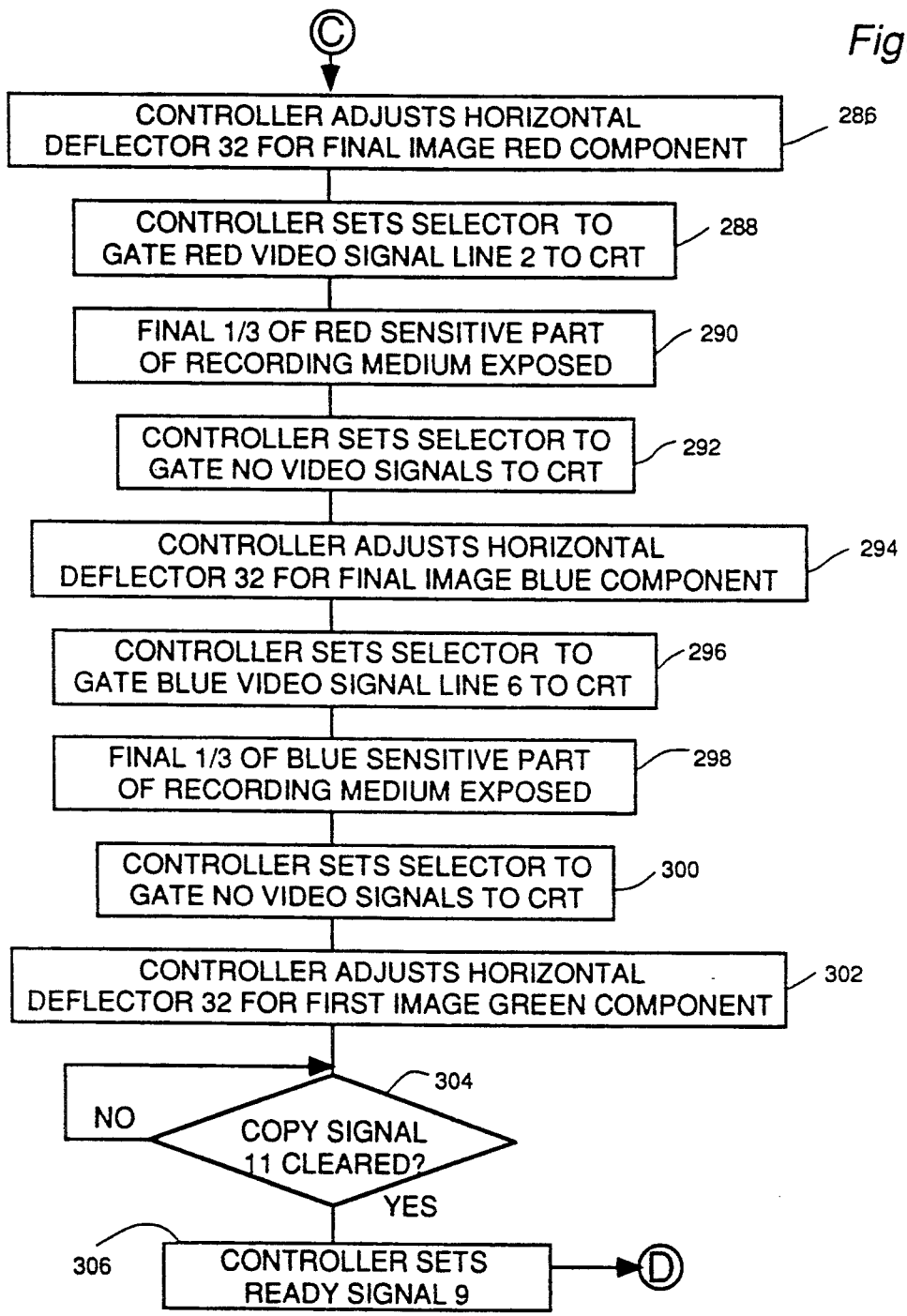

Turning to FIG. 11D, controller 18: p1 at box 286 adjusts actuator 32 for the predetermined amount of horizontal deflection to precisely register the final image red component onto the previously recorded final green component image, and
  at box 288 sets selector 10 to gate on the red video signal to CRT 20 via line 2.

At box 290 the final ⅓ of the red sensitive part of the recording medium 28 is exposed. Then the controller 18:
  at box 292 sets selector 10 to gate no video signals to CRT 20,
  at box 294 adjusts actuator 32 for the predetermined amount of horizontal deflection to precisely register the final image blue component onto the previously recorded final green and red component images, and
  at box 296 sets selector 10 to gate on the blue video signal to CRT 20 via line 6.

At box 298 the final ⅓ of the blue sensitive part of the recording medium 28 is exposed. Then the controller 18:
  at box 300 sets selector 10 to gate no video signals to CRT 20, and
  at box 302 adjusts actuator 32 for the predetermined amount of horizontal deflection to precisely register the first image green component ready for the next COPY sequence.

At decision box 304 no further event occurs until the COPY signal is cleared on line 11; then the controller 18 at box 306 sets the READY signal on line 9.

Then, as indicated by the circled letter D, the system loops back to decision box 212 (FIG. 11A) and awaits a command in the form of a COPY signal on line 11 to start another COPY sequence.

Referring to FIG. 1, the rotary actuator 32 driving the deflector plate 26 is precisely controlled by the controller 18 in such a manner that the deflector plate 26 may be rotated by a very minute angle just enough to shift the image horizontally on the photosensitive surface of the recording medium 28 by one element of a color triad. Similarly actuator 30 can produce a precise vertical shift in response to controller 18; however vertical shifting is not required in the particular embodiment described which utilizes a color CRT of the type having a vertical stripe pattern, thus actuator 30 and deflector plate 24 could be omitted. Alternatively, the color CRT display could be of the type having a horizontal stripe pattern; in that case the required shifting would be only in the vertical direction, so controller 18 would be accordingly adapted to actuate only driver 30, thus actuator 32 and deflector plate 26 could be omitted. A color CRT of the type where the color triads are arranged in a delta or triangular pattern would require image shifting in both horizontal and vertical directions and thus would require the complete image shifter system shown in FIG. 1, or an equivalent system, receiving appropriate input from controller 18 to register the triad.

The two deflector plates 24 and 26 shown use refractive windows. However, other arrangements, for example mirrors, can be used within the scope of the invention.

As an alternative to acting on the optical beam by deflector plates 24 and 26, image shifting could be accomplished by appropriately shifting either the display 20 or the recording media 28.

While the embodiment shown and described indicates the use of a three color CRT display utilizing RGB primary colors, the most common system in use, the principle of the invention could be readily practiced with displays having two, four or more colors, and/or alternative primary colors could be chosen.

The sequence of colors in the processes described are arbitrary; thus the invention could be practiced using practically any other color sequence.

There are further options which will become apparent to those of skill in the video and optical arts including the use of a perforated mask between the display light source and the rest of the optical system; the display light source may be, for example, a valve type such as a liquid crystal display or the phosphor screen of a CRT display (which may be color or monochrome) to create sparse matrix frames which may be sequentially exposed as interspersed images for increasing resolution in accordance with this invention.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A method for producing on a photographic medium a registered-field copy of a picture from stored picture information encoded in a system having at least two color fields per frame, utilizing a spatial-field light-emitting display, comprising the steps of:
   (a) operating monitor input selector means so as to produce on the medium a first color field image and to thus record the first color field image on the medium;
   (b) operating image-shifting means, adapted to shift the image relative to the medium, in a manner to anticipatedly register a second color field image coincident on the medium with the recorded first color field image;
   (c) operating the selector means to produce on the medium a thusly registered second color field image and to thus record the second color field image on the medium coincident with the recorded first color field image; and
   (d) for each color field of the system in excess of two, operating the image-shifting means in a manner to anticipatedly register a corresponding color field image on the medium precisely registered with the previously recorded image, then operating the selector means to produce on the medium a registered corresponding color field image and to thus record the corresponding color field image on the medium precisely registered with the previously recorded image.

2. The method of producing a copy as defined in claim 1, wherein means are provided for enlarging all elemental exposure regions in at least one dimension, and wherein the method further comprises the step of:
   enlarging all elemental exposure regions areas to occupy a region corresponding to that originally occupied by a frame set of field picture elements; whereby in the copy all elemental exposure regions are thusly held in registration but enlarged to be substantially contiguous on all sides, thus accomplishing full coverage exposure of the medium.

3. A method for producing a registered-color photographic copy of a color picture from a spatial-color screen of a video monitor receiving picture information defining levels of brightness and color, the monitor co-operating with selector means for displaying any selected one of three primary color fields, optical means for focusing an image of the picture onto a photosensitive recording medium and image-shifting means for shifting the image relative to the medium in a predetermined direction and amount approximating a picture element spacing, the method comprising the steps of:
   (a) operating the selector means to produce on the medium a first primary color field image and to thus record the first image on the medium;
   (b) operating the image-shifting means in a manner to anticipatedly register a second primary color field image coincident on the medium with the first image;
   (c) operating the selector means to produce on the medium a thusly registered second primary color field image and to thus record the second image on the medium; and
   (d) operating the image-shifting means in a manner to anticipatedly register a third primary color field image coincident on the medium with the first and second images; and
   (e) operating the selector means to produce on the medium a thusly registered third primary color field image and to thus record the third image on the medium, thus providing, along with the first and second images, a frame of the picture, recorded on the medium, in which all three frames are registered and free of monitor spatial-color artifacts.

4. The method producing a copy as defined in claim 3, wherein means are provided for enlarging all elemental exposure regions in the image, in at least one dimension, and wherein the method further comprises the step of:
   enlarging all elemental exposure regions areas to occupy an area corresponding to that originally occupied by a frame set of field picture elements; whereby in the copy all elemental exposure regions are thusly held in registration but enlarged to be substantially contiguous on all sides, thus accomplishing full coverage exposure of the medium.

5. The method of producing a copy as defined in claim 3 wherein the three primary colors are red, green and blue.

6. The method of producing a copy as defined in claim 5 wherein triads of primary colors are diposed on the screen of the video monitor as adjacent vertical stripes and thus image-shifting is required only along a horizontal axis.

7. A method for preserving resolution in producing on a photographic medium a copy of a picture originating from a video source organized in fields and frames, the copy being exposed from a spatial-field display having a lower limit of real time frame resolution than the medium and the source, the method comprising the steps of:

(a) recording a first frame of registered fields in a sparse matrix of elemental exposure regions on the medium;

(b) shifting the exposure regions on the medium by image-shifting means to adjacent unexposed regions spatially interleaved with the exposure regions of the first frame;

(c) recording a second frame of registered fields in a sparse matrix of elemental exposure regions on the medium;

(d) for each of any additional frames having corresponding medium space available, shifting the exposure regions on the medium by image-shifting means to adjacent unexposed regions spatially inter-leaved with the exposure regions of the previous frames, and recording a corresponding frame fo registered fields in a sparse matrix of elemental exposure regions on the medium.

8. The method for preserving resolution in producing a copy as defined in claim 7 whererin the video source is organized in three primary colors and the display is presented on a screen of a video monitor of the spatial-color RGB CRT type, whereby the sparse matrix in step (a) has substantially two thirds of total picture area unexposed, and wherein step (d) thus comprises subordinate steps of:

(d1) shifting the exposure regions by image-shifting means to an adjacent unexposed location on the medium; and (d2) recording a third frame of registered fields in a sparse matrix of elemental exposure regions on the medium.

9. An apparatus for producing a hard copy of a picture represented by a periodic video signal defining attributes of the picture organized in frames each having a plurality of field components, the apparatus comprising:

an electronic color display monitor, having an electroluminescent screen adapted to display a picture on the screen in accordance with components of the video signal;

field selector means enabling selection of none, one, or more of the field components to be displayed as a single field picture on said monitor;

optical means for placing and recording an image of the displayed field picture on a photosensitive recording medium; and image shifting means enabling the image to be controllably shifted relative to the medium;

whereby, after a first exposure recording a first field image on the medium, a second image, being that from a second field, may be shifted in a manner to superimpose each pixel of the second image precisely on a corresponding pixel of the first field image and thusly recorded on the medium in a second exposure, and thereafter, for each of any additional fields, a corresponding image may be shifted in a manner to superimpose each pixel of the corresponding image precisely on a corresponding pixel of the first and second images and thusly recorded on the medium in a subsequent exposure; thus yielding on the medium a copy of the complete frame of the picture comprising the first, second and any additional fields, mutually registered and free of spatial-field artifacts of the monitor screen.

10. The apparatus for producing a hard copy a defined in claim 9 wherein said image shifting means comprises at least one transparent deflector plate interposed in an optical path between the monitor and the medium, the deflector plate being disposed orthogonal to the optical path such that the path passes through a central region of the plate, the plate being adapted and actuated to controllably pivot about an axis perpendicular to the optical path so as to produce upon command, through internal refraction in the deflector plate, a predetermined displacement of the image on the medium.

11. The apparatus for producing a hard copy a defined in claim 9 wherein said field selector means is further adapted to enable said monitor to display all fields of a frame simultaneously, so as to thus display a complete frame of the picture for reference and adjustment purposes.

12. The apparatus for producing a hard copy a defined in claim 9, wherein the video source provides RGB color picture information in three signals each representing a primary color field component, wherein said monitior is of a CRT type wherein the screen comprises adjacent elongated electroluminescent stripes arrayed in triads of red, green and blue primary colors, and wherein said image shifting means is accordingly adapted to provide image displacement along an axis of the medium perpendicular to the stripes.

13. The apparatus for producing a hard copy as defined in claim 9 further comprising image element enlargement means, which either operates in conjuction with or is integrated with said shifting means, for enlarging picture elements of an image in at least one direction as recorded on the medium during each of the exposures so as to cause picture elements in the copy of the complete frame to be substantially contingent on all sides, thus maximizing area utilization of the medium.

14. The apparatus for producing a hard copy as defined in claim 13, further comprising:

a controller adapted to operate said field selecting means, said image shifting means and said image element enlargement means in a co-operative manner to automatically perform a required number of sequential exposures and thus produce a registered copy.

15. The apparatus for producing a hard copy as defined in claim 9, further adapted to enable capturing in the copy a level of resolution, available in a video signal source, exceeding a real time resolution limit of said monitor, the apparatus further comprising:

a controller adapted to operate said field selecting means and said image shifting means in a co-operative manner to (a) record a first frame sparsely exposed such that a portion of the medium's total picture area remains unexposed, (b) record a second frame in a similar manner with all elements of the image shifted by the image shifting means to adjacent regions which were not exposed by the first frame, and (c) record each of any further available frames in a similar manner with all elements of each frame image shifted by the image shifting means to adjacent regions which were not previously exposed.

* * * * *